United States Patent [19]

Joyner

[11] Patent Number: 4,464,265
[45] Date of Patent: * Aug. 7, 1984

[54] VALVE DEVICE FOR STOCK/SAUCE SKIMMER AND THE LIKE

[76] Inventor: Auvin H. Joyner, 2 Walnut St., Pawling, N.Y. 12564

[ * ] Notice: The portion of the term of this patent subsequent to May 25, 1999 has been disclaimed.

[21] Appl. No.: 503,237

[22] Filed: Jun. 10, 1983

[51] Int. Cl.³ .............................................. B01D 12/00
[52] U.S. Cl. ..................................... 210/517; 210/538
[58] Field of Search ................... 141/1, 250, 263, 264, 141/284, 331, 335, 343, 344, 345, 347, 349, 352, 384, 386; 210/538, 540, 517; 222/461, 549, 551, 552; 251/304

[56] References Cited

U.S. PATENT DOCUMENTS

| | | | |
|---|---|---|---|
| 1,903,464 | 4/1933 | Konanz | 222/551 |
| 3,199,831 | 8/1965 | Sully | 141/349 X |
| 4,031,032 | 6/1977 | Jablecki | 141/344 X |
| 4,182,388 | 1/1980 | Sellen | 141/384 X |
| 4,331,189 | 5/1982 | Joyner | 141/331 X |

Primary Examiner—Stephen Marcus
Assistant Examiner—Mark Thronson
Attorney, Agent, or Firm—Richard L. Miller

[57] ABSTRACT

A valve device for stock/sauce skimmer and the like is provided and comprises a container in which is stored liquid to be separated from fats and solids contained in the liquid, a cylinder extending down from the container having a passage for the liquid, a sleeve mounted around lower edge of the cylinder having projecting pins, a base forming a central passage that receives the sleeve of the cylinder, the inner surface of the base having slots capable of mating with the projecting pins of the sleeve thus forming a bayonet quick coupling device and a valve seated within the passage and set upon the base so that when the container is rotated the container rises and opens the passage in which the valve is mounted, allowing passage of the separated liquid from the device.

7 Claims, 4 Drawing Figures

VALVE DEVICE FOR STOCK/SAUCE SKIMMER AND THE LIKE

BACKGROUND OF THE INVENTION

The present invention relates generally to liquid separators and more specifically it relates to a valve device for stock/sauce skimmers and the like that separates fats and solids from a liquid. Typical stock/sauce skimmers that this invention is ideally suited to be incorporated with are described in applicant's U.S. Pat. No. 4,331,189, granted on May 25, 1982, and applicant's additional pending application Ser. No. 453,150, filed on Dec. 27, 1982.

When a person prepares cooked meat, such as roasts, chicken, meat balls etc., fat and solids mix together into the liquid drippings thus making it difficult to use the liquid as a gravy or sauce, and the fats for spreads or shortening. This situation is not desirable so accordingly it is in need of an improvement.

SUMMARY OF THE INVENTION

A principle object of the present invention is to provide a valve device for stock/sauce skimmer and the like that utilizes projecting pins and slots thus forming a bayonet quick coupling device which will enhance the efficiency and convenience for the user of the device.

Another object is to provide a valve device that can increase the flow of liquid when fat and solids block the flow of liquid.

An additional object is to provide a valve device that uses a boilable washer forming outer periphery of the valve rim.

A further object is to provide a valve device that is simple and easy to use.

A still further object is to provide a valve device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENTS

Figure 1:
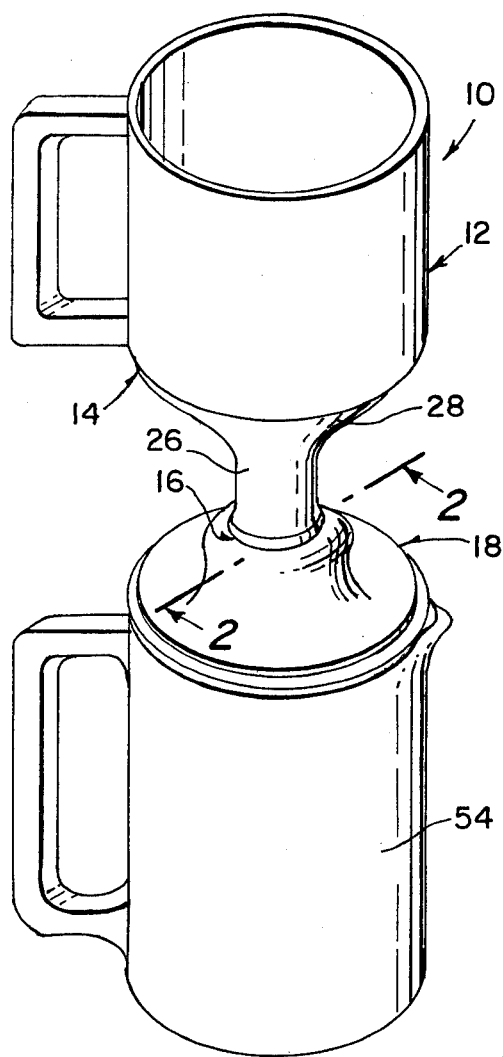
FIG. 1 is a perspective view of a typical stock/sauce skimmer assembled incorporating the present invention.
Figure 4:
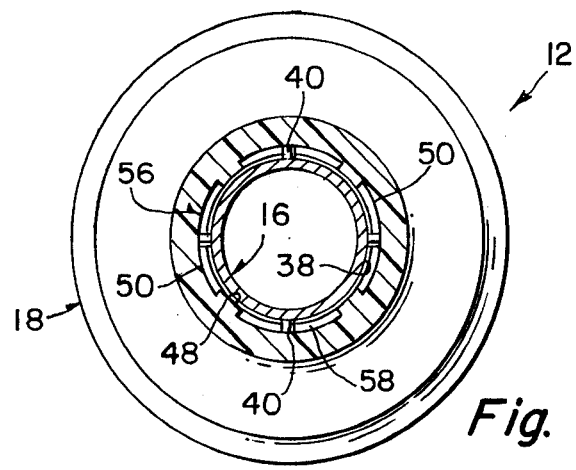
FIG. 4 is a cross sectional view taken on line 4—4 of FIG. 2.
Figure 3:
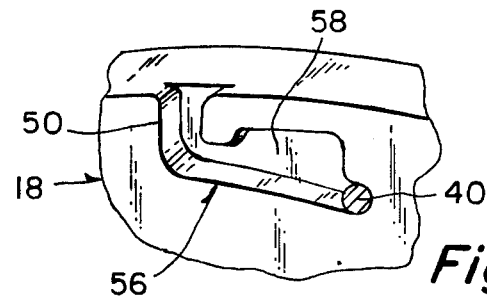
FIG. 3 is a still further enlarged partial broken cross sectional view taken on line 3—3 of FIG. 2.
Figure 2:
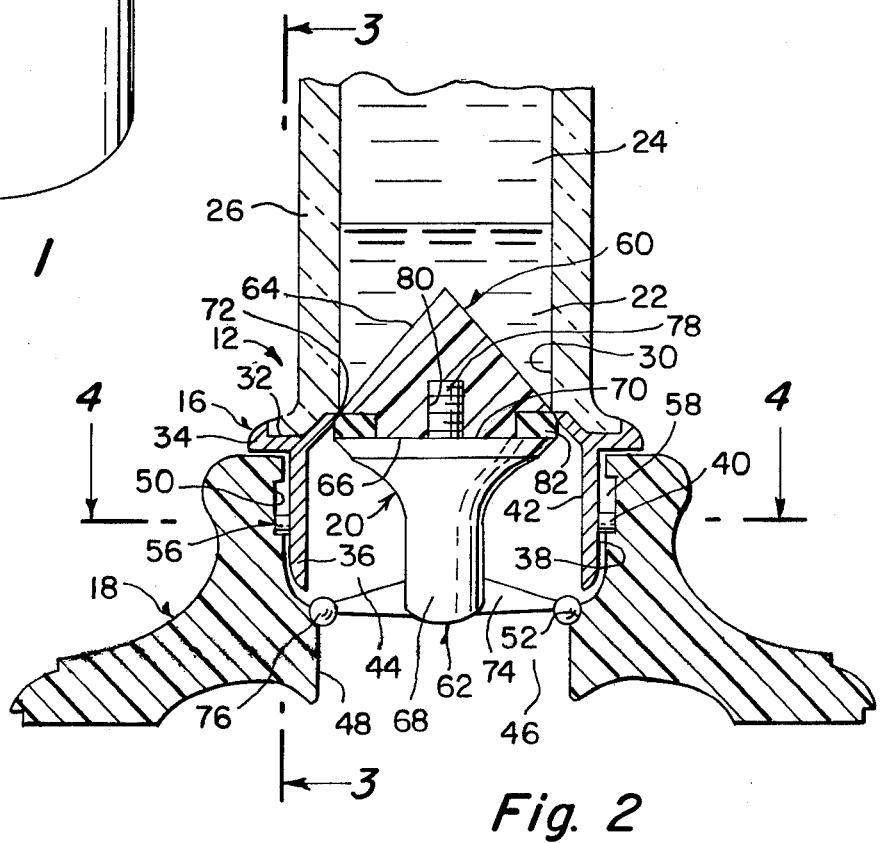
FIG. 2 is an enlarged partial cross sectional view taken on line 2—2 of FIG. 1.

Turning now descriptively to the drawings, in which similar reference characters denote similar elements throughout the several views, FIGS. 1 through 4 illustrates a valve device 10 for stock/sauce skimmer 12 and the like and consists of a container 14, a sleeve 16, a base 18 and a valve 20.

A liquid to be separated from fats and solids 24 is stored within the container 14. The container 14 has a cylinder 26 at a lower portion 28 thereof. The cylinder 26 normally transparent forms a vertical first passage 30 through which the liquid 22 may flow.

The sleeve 16 is fixedly mounted around lower edge 32 of the cylinder 26. The sleeve 16 has upper and lower portions 34 and 36. Outer surface 38 of the lower portion 36 being provided with four projecting pins 40. Inner surface 42 of the sleeve 16 forms a vertical second passage 44 coextensive with the first passage 30.

The base 18 forms a vertical central third passage 46 having an inner surface 48 adapted to receive the lower portion 36 of the sleeve 16. The second passage 44 and the third passage 46 being coextensive. The base 18 has typically four slots provided on the inner surface 48 adapted to engage with the pins 40. The third passage 46 has a circumferential inner ledge 52.

The valve 20 is mounted upon the ledge 52 for opening and closing the first passage 30 when the container 14 is rotated relative to the base 18. When the container 14 is raised relative to the base 18 the first passage 30 is lifted away from the valve 20 allowing flow of the liquid 22 though the second and third passages 44 and 46. When the container 14 is lowered relative to the base 18 the first passage 30 will engage with the valve 20 blocking flow of the liquid 22 through the first passage 30. The separated liquid 22 may be removed from the container 14 at a controlled rate into a collecting cup 54.

The projecting pins 40 on the outer surface 38 of the lower portion 36 of the sleeve 16 and the slots 50 on the inner surface 48 of the base 18 form a bayonet quick coupling device 56. Each slot 50 contains a wide area portion 58. When the solids (not shown) block the flow of the liquid 22 the pins 40 in the wide area portions 58 can move upwards, when raising the container 14, to increase the flow of the liquid 22 without dislodging the sleeve 16 from the base 18.

The valve 20 consists of a conic top 60 and a post member 62. The conic top 60 has an upwardly disposed apex 64 and a downwardly disposed flat bottom 66. The post member 62 has a downwardly disposed shaft 68 and an upwardly disposed flat top 70 of the post member 62. The conic top 60 forms a circumferential valve rim 72 capable of engagement and disengagement with the first passage 30 when the container 14 is moved downward and upward respectively relative to the base 18.

A plurality of legs 74 are connected to and extending outwardly from the bottom of the shaft 68 of the post memeber 62. The legs 74 have feet 76 that are removably positioned on the ledge 52 of the base 18.

A screw threaded member 78 is positioned in center of the flat top 70 of the post member 62. The conic top 60 has a screw threaded mating receiving aperture 80 for dismountably receiving the screw threaded member 78.

A boilable washer 82 is posed between the conic top 60 and the post member 62 forming an outer periphery of the valve rim 72.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A valve device for stock/sauce skimmer and the like which comprises:
   (a) a container in which is stored liquid to be separated from fats and solids contained in the liquid, said container having a cylinder at a lower portion thereof, the cylinder forming a vertical first passage through which the liquid may flow;
   (b) a sleeve fixedly mounted around the lower edge of the cylinder, said sleeve having upper and lower portions, the outer surface of the lower portion being provided with a plurality of projecting pins, the inner surface of said sleeve forming a vertical second passage coextensive with the first passage;
   (c) a base forming a vertical central third passage having an inner surface adapted to receive the lower portion of said sleeve, the second passage and the third passage being coextensive, said base having a plurality of slots provided on the inner surface adapted to engage with the pins, the third passage having a circumferential inner ledge; and
   (d) valve means mounted upon the ledge for opening and closing the first passage when said container is rotated relative to said base so that when said container is raised relative to said base the first passage is lifted away from said valve means allowing flow of the liquid through the second and third passages and when said container is lowered relative to said base the first passage will engage with said valve means blocking flow of the liquid through the first passage whereby the separated liquid may be removed from said container at a controlled rate.

2. A valve device as recited in claim 1 wherein the projecting pins on the outer surface of the lower portion of said sleeve and the slots on the inner surface of said base form a bayonet coupling device.

3. A valve device as recited in claim 2 wherein each slot contains a wide area portion so that when the solids block the flow of the liquid the pin in said wide area portion can move upwards when raising said container to increase the flow of the liquid without dislodging said sleeve from said base.

4. A valve device as recited in claim 3, wherein said valve means includes:
   (a) a conic top having an upwardly disposed apex and a downwardly disposed flat bottom; and
   (b) a post member having a downwardly disposed shaft and an upwardly disposed flat top, the flat bottom of said conic top forming a circumferential valve rim capable of engagement and disengagement with the first passage when said container is moved downward and upward respectively relative to said base.

5. A valve device as recited in claim 4, wherein said valve means further includes a plurality of legs connected to and extending outwardly from the bottom of the shaft of said post member, said legs having feet being removably positioned on the ledge of said base.

6. A valve device as recited in claim 5, wherein said valve means further includes a screw positioned in the center of the flat top of said post member, said conic top having a screw receiving aperture for dismountably receiving said screw.

7. A valve device according to claim 6, further including a boilable washer posed between said conic top and said post member forming an outer periphery of the valve rim.

* * * * *